April 30, 1940.  A. C. DE HOFFMANN  2,198,657
SELF-RELEASING AUTOMOBILE BUMPER GUARD
Filed Feb. 4, 1938  2 Sheets-Sheet 1
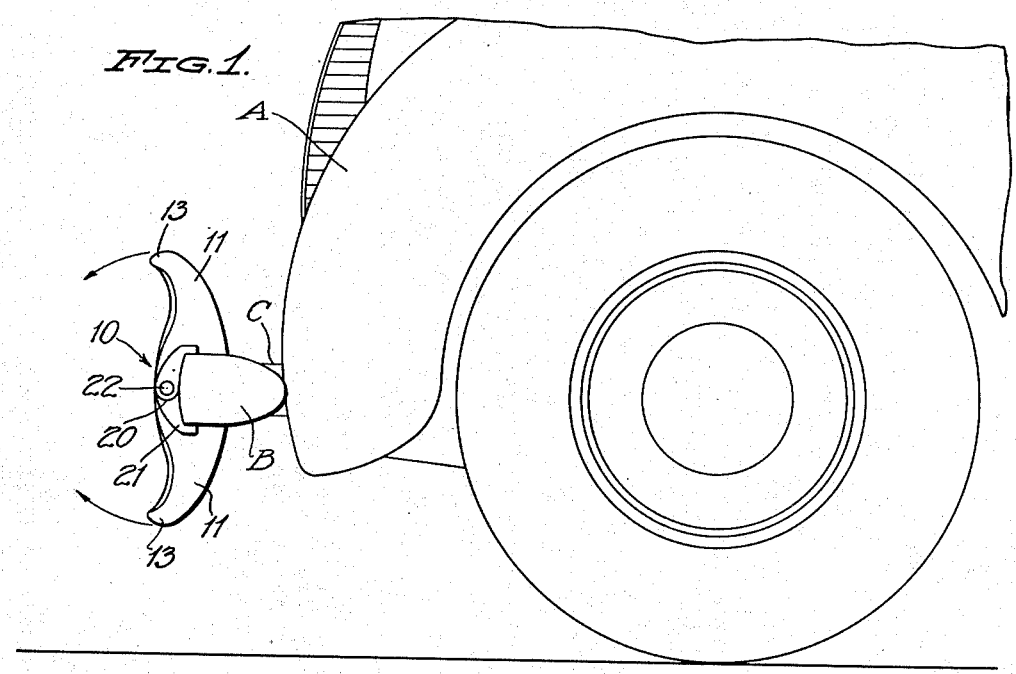
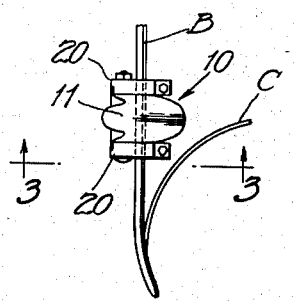
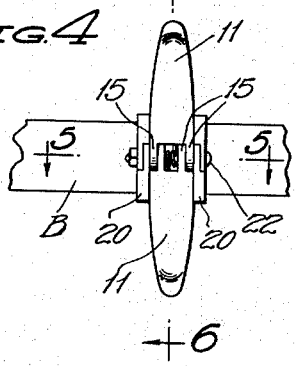
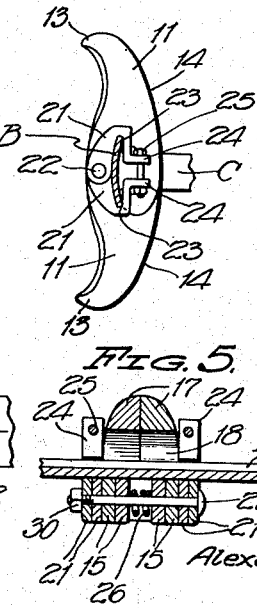
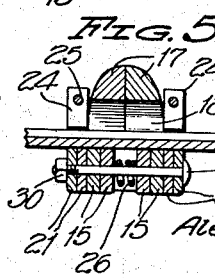
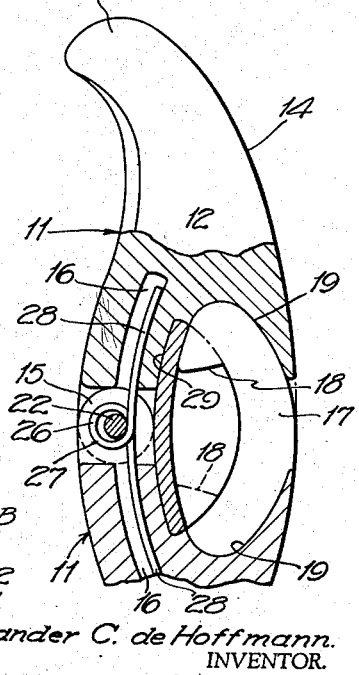
Alexander C. de Hoffmann.
INVENTOR.
BY Ely + Pattison
ATTORNEYS.

April 30, 1940.   A. C. DE HOFFMANN   2,198,657
SELF-RELEASING AUTOMOBILE BUMPER GUARD
Filed Feb. 4, 1938   2 Sheets-Sheet 2
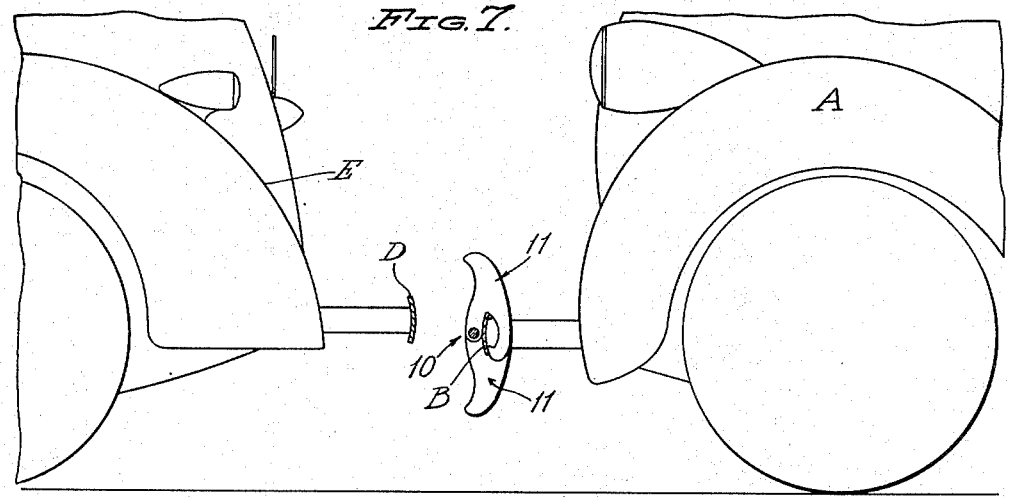
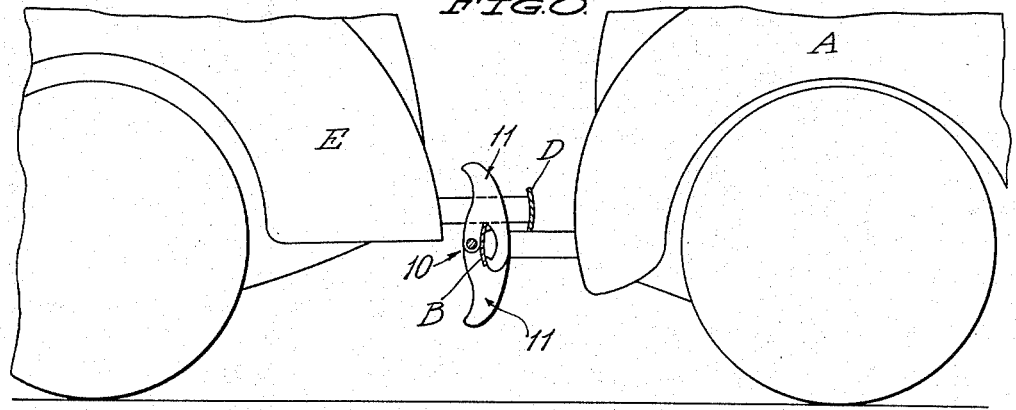
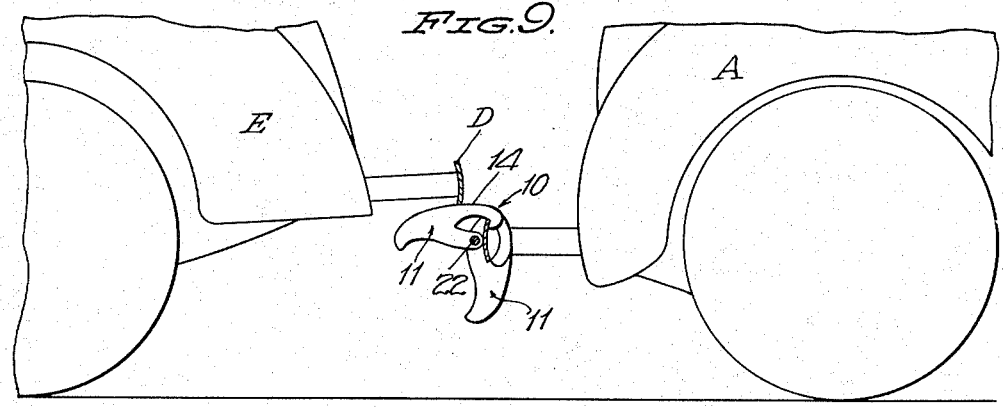
Alexander C. de Hoffmann.
INVENTOR.

Patented Apr. 30, 1940

2,198,657

UNITED STATES PATENT OFFICE 2,198,657

SELF-RELEASING AUTOMOBILE BUMPER GUARD

Alexander C. de Hoffmann, New York, N. Y.

Application February 4, 1938, Serial No. 188,669

10 Claims. (Cl. 293—55)

This invention relates to improvements in bumper guards for automobiles.

The primary object of the invention resides in a bumper guard which acts in the usual manner to prevent the entanglement of the bumper bars of two automobiles, and which enables the free disentanglement of two bumper bars should they become accidentally entangled.

Another feature of the invention is to provide a releasable bumper guard which will withstand the ordinary shocks to which the front of such guards are subjected when in use to prevent injury to an automobile by impact with the bumper bar of another automobile, and which bumper guard is yieldable to a force imparted to the rear thereof to enable the disentanglement of a bumper bar which might in some manner become entangled behind the bumper guard.

Another feature of the invention is the provision of a releasable bumper guard which is rigid against forces imparted to the front thereof and yieldable against forces imparted to the rear thereof, the guard being provided with curved surfaces over which an entangled bumper bar may ride to free itself upon movement of two automobiles away from each other, there being means for restoring the bumper guard to normal position when the entangled bumper bar clears the bumper guard.

A further feature of the invention is to provide a self releasing bumper guard for automobiles which resembles in design the conventional bumper guard so as not to detract from the general appearance of an automobile; which is strong and durable and which may be easily disassembled for the replacement of any parts which may become accidentally broken when the guard is subjected to excessive shocks.

With these and other objects in view, the invention resides in the novel combination and arrangement of parts, the essential features of which are described in the following specification, are particularly pointed out in the appended claims and are illustrated in the accompanying drawings, in which:

Figure 1 is a fragmentary side elevation of the front end of an automobile illustrating the self releasing bumper guard in position upon the bumper bar thereof.

Figure 2 is a top plan view of one of the bumper guards located adjacent one end of a bumper bar.

Figure 3 is a vertical sectional view on the line 3—3 of Figure 2.

Figure 4 is a front elevational view.

Figure 5 is an enlarged horizontal sectional view on the line 5—5 of Figure 4.

Figure 6 is an enlarged fragmentary vertical sectional view on the line 6—6 of Figure 4.

Figures 7, 8, and 9, are diagrammatic views illustrating the manner in which the bumper bars of two automobiles may become entangled and released by the action of the self releasing bumper guard.

Referring to the drawings by reference characters, the letter A designates a fragmentary portion of the front of an automobile equipped with the usual horizontally disposed bumper bar B, the said bar being supported by brackets C. Mounted on the bumper bar B in a manner to be hereinafter explained, is one or more bumper guards, each designated in its entirety by the numeral 10, and in practice there may be two of such guards adjacent the ends of the bumper bar B, or three of such guards may be provided, two adjacent the ends and one centrally of the bumper bar.

Each bumper guard 10 includes a pair of guard members 11—11 which are normally disposed in a vertical position and extend above and below the bumper guard B. The members 11—11 are of identical construction and a description of one will suffice for the other.

Each bumper guard member 11 is constructed of strong rigid material and includes a body portion 12, the outer end of which terminates in a reduced nose portion 13. The front side of the body 12 is bellied out adjacent its inner end and is concave adjacent the outer end, whereas the rear side of the body 12 is curved convexly as at 14 for a purpose to be presently explained. The inner end of the body 12 at the front thereof is provided with spaced ears 15 having alined openings therein and extending inwardly of the body from its inner end is a socket 16. Extending inwardly from the body 12 at the rear thereof is a tail piece 17, which tail piece is substantially one-half the width of the inner end of the body so that the tail pieces 17 of the two guard members 11 fit side by side as illustrated in Figure 5 of the drawings. The tail piece 17 is of arcuate shape and its free end is provided with a stop shoulder 18. The inner end of each guard member 11 is provided with a recessed portion 19 to receive the free end of the tail piece 17 of the other guard member when the said guard members are in normally vertical guarding position.

Suitable means is provided for removably securing the guard members 11—11 in position upon the bumper bar B and such means includes a pair of spaced attaching clamps 20—20. Each clamp 20 includes a pair of clamp members 21—21 pivotally mounted upon a removable bolt 22, the said members being provided with recesses or jaws 23 which coact to clamp upon the bumper bar B, the free terminal ends of the clamp members terminating in inwardly extending horizontal ears 24 which are fastened together by a bolt 25.

Mounted on the horizontally disposed bolt 22 are the guard members 11—11, the said bolt 22 passing through the openings in the alined ears 15 of the guard members 11. The ears 15 of the lower guard member are more closely spaced than those of the upper guard member in order that the ears may interfit as clearly shown in Figure 4 of the drawings. Disposed within the space between the ears 15 of the lower guard member are the convolutions 26 of a spring 27, the said spring including resilient arms 28 which extend from the end convolutions of the coil 26 and seat against the inner wall of the sockets 16 of the guard members 11. The spring 27 imparts a tension to the guard members 11 to swing the same rearwardly away from each other. The clamps 20—20 secure the bumper guard forward of the bumper bar B, and a portion 29 of the body 12 of each guard member 11 abuts the bumper bar to limit the rearward movement of the guard member against the action of the spring 27. The free ends of the tail pieces 17 abutting the walls of the recesses 19 of the respective guard members also act to limit the rearward swinging movement of the guard members and to hold the guard members rigid against any forces of impact imparted against the front of the guard members.

From the description thus far, it will be understood that the guard members 11 are normally disposed in a vertical position and are sufficiently braced to withstand the impacts imparted to the front side of the said members. However, the guard members 11 are capable of forward pivotal movement against the action of the spring 27 and such movement is limited to approximately ninety degrees by reason of the stop shoulder 18 of the tail piece 17 of each guard member being engageable with the rear side of the bumper bar B. The feature of constructing the guard members to swing forwardly about the common axis of the bolt 22 will now be explained.

In Figures 7, 8, and 9 of the drawings, I have illustrated the operation of my self-releasing bumper guard. In Figure 7 the bumper guard 10 on the automobile A is shown in normal position, and about to be entangled with the bumper bar D of another automobile E. Should the bumper bar D strike the front of the bumper guard 10, the bumper guard 10 will withstand the impact, but in some instances the bumper bar D will ride over or under the bumper guard 10 and find its way behind the bumper guard 10 as illustrated in Figure 8 of the drawings. With the upper guard member 11 of the bumper guard 10 and the bumper D entangled in the manner shown in Figure 8, it is possible to release these parts by moving the automobile A rearwardly, or by moving the automobile E forwardly. During the movement of one vehicle relative to the other under its own motive power, the bumper bar D will strike the upper bumper guard member 11 and forcibly swing the same forwardly to a substantially horizontal position as illustrated in Figure 9, wherein the stop shoulder 18 of the tail piece 17 of the upper guard member is in hooking engagement with the bumper bar D. Due to the convex curvature 14 of the rear side of the guard member, the bumper bar D will freely ride thereover and will be eased to a lowered position until it clears the nose end 13 of the guard member, whereupon the spring 27 returns the upper guard member to its normal vertical position. It will be understood that certain of the strain upon the upper guard member 11 due to the pressure exerted by the over riding bumper bar D, is transmitted to the bumper bar B by reason of the hooking engagement of the tail piece 17 with the rear of the bumper bar 10.

While I have shown and described an entangled bumper D with the upper bumper guard 11, it will be understood that should the bumper of another car become entangled beneath the lower guard member 11, a similar action will take place, although the surface 14 of the lower guard member will ride over the entangled bumper bar.

In the event that either of the guard members 11 might become damaged, or should the spring 27 break or lose its tension, such parts may be easily replaced by unscrewing the nut 30 which is threaded to one end of the bolt 22, and withdrawing the bolt from the alined openings in the ears 15. Also, if desired, the guard members 11 may be secured in position upon the bumper bar B by other means than the clamps 20—20 herein shown and described. The attaching means disclosed herein provides a bumper guard attachment for bumper bars, but if desired the support for the guard members 11 may be formed integral with the bumper bar B.

While I have shown and described what I consider to be the most practical embodiment of my invention, I wish it to be understood that such changes and alterations as come within the scope of the appended claims may be resorted to if desired.

Having thus described the invention, what I claim as new and desire to secure by Letters Patent of the United States, is:

1. In combination, a bumper bar, a bumper guard including a pivoted elongated guard member having a rearwardly disposed tail portion, means for mounting said pivoted member upon said bumper bar, spring means acting upon said pivoted guard member to normally urge the same to a vertical upstanding position with the tail portion disposed rearward of said bumper bar, stop means for limiting the rearward movement of said guard member beyond a substantially vertical position, stop means for limiting the forward movement of said guard member to a substantially horizontal position, and a smooth convexly curved surface provided on the rear side of said guard member along the full length thereof to enable an entangled bumper bar to ride thereover when said guard member is forcibly moved to a substantially horizontal position during a bumper disentanglement operation.

2. In combination, an automobile bumper bar, a bumper guard including a pair of pivotally connected guard members, means for attaching the bumper guard to said bumper bar transversely thereof with the members respectively extending above and below said bumper bar, stop elements on said guard members engageable with the rear of said bumper bar for limiting the rearward movement of said guard members beyond a substantially vertical position, spring means acting to normally hold said guard members at the limit of their rearward swinging movement, and stop means for limiting the forward movement of said guard members to a substantially horizontal position to enable the release of a second bumper bar when becoming accidentally hooked behind either of said guard members.

3. In combination, an automobile bumper bar, a self releasing bumper guard including a pair of elongated guard members pivotally connected at one of their ends, each of said guard members having a rearwardly extending portion, attaching means for securing said bumper guard transversely of said bumper bar with the rearwardly extending portions thereof disposed rearwardly of said bumper bar, spring means acting upon said guard members to swing the same in a direction away from each other, stop means for limiting the rearward swinging of said members beyond a substantially vertical position, and stop means on the rearwardly extending portions of each of said guard members engageable with the rear of said bumper bar for limiting the forward swinging movement of the members to a substantially horizontal releasing position.

4. In combination, an automobile bumper bar, a self releasing bumper guard including a pair of elongated guard members pivotally connected at one of their ends, each of said guard members having a rearwardly extending portion, attaching means for securing said bumper guard transversely of said bumper bar with the rearwardly extending portions thereof disposed rearwardly of said bumper bar, spring means acting upon said guard members to swing the same in a direction away from each other, stop means for limiting the rearward swinging of said members beyond a substantially vertical position, stop means on the rearwardly extending portion of each of said guard members engageable with the rear of said bumper bar for limiting the forward swinging movement of the members to a substantially horizontal releasing position, and a convexly curved surface provided on the rear side of each guard member against which an entangled bumper bar is adapted to ride during a bumper releasing operation.

5. In combination, an automobile bumper bar, a self releasing bumper guard including a pair of guard members pivotally connected at one of their ends, attaching means for securing said guard member to the front side of said bumper bar transversely thereof, spring means urging said guard members in a rearward direction, stop means for limiting the rearward movement of said guard members so as to normally be disposed in a substantially vertical position, and tail stop elements integral with said guard members and extending rearwardly of said bumper bar for engagement therewith to limit the forward swinging movement of said guard members to a substantially horizontal bumper releasing position.

6. In combination, an automobile bumper bar, a supporting bracket secured to said bumper bar, a pair of guard members pivotally mounted on said bracket, each of said guard members having a portion extending rearwardly of said bumper bar, spring means acting to urge said members in a rearward direction away from each other to dispose the same respectively above and below the plane of said bumper bar, stop means for limiting the movement of said members away from each other to normally dispose the same in a substantially normal vertical position, whereby to rigidly withstand impact imparted to the front of said guard members and to yieldingly swing forward to a bumper releasing position upon application of a force imparted to the rear of said guard members sufficient to overcome the tension of said spring means, and stop elements provided on the rearwardly extending portions of said guard members and engageable with the rear of said bumper bar to limit the forward movement of said guard members to a substantially horizontal position.

7. A self releasing bumper guard for attachment to an automobile bumper bar comprising an attaching bracket, a pair of cam like guard members carried by said bracket and coacting to completely surround a bumper bar and being mounted on a common horizontal pivotal axis, spring means acting upon said guard members to normally hold the same in substantially vertical co-extensive relation, stop means limiting the swinging movement of said members under the action of said spring means beyond a substantially vertical position, and stop elements on the rear portions of said guard members adapted to engage the rear of a bumper bar for limiting the movement of said guard members to a substantially horizontal position in a direction against the tension of said spring means.

8. In combination, a horizontally disposed bumper bar, a bracket clamped to said bumper bar, a guard members pivoted to said bracket forward of said bumper guard and having a portion extended rearwardly of said bumper bar, a cam surface provided on the rear sides of said guard member, stop means engageable by said guard member for limiting the rearward swinging movement of the same when said guard member reaches a vertical upstanding position to extend above the top of the bumper bar, spring means acting upon said guard member to normally hold the same in an upstanding position, and a shoulder provided on the rearwardly extending portion of said guard member and engageable with said bumper bar to limit the forward swinging movement of said guard members to a substantially horizontal position.

9. In combination, an automobile bumper bar, a self releasing bumper guard including a pair of guard members arranged in reverse relation, each guard member having a forward portion and a rearward portion, pivot means connecting the forward portions of said guard members together, attaching means for supporting said guard members upon said bumper bar with the forward pivoted portions disposed forward of the bumper bar and the rearwardly extending portions disposed rearwardly thereof, whereby said guard members substantially surround said bumper bar, spring means acting to move said guard members rearwardly, stop means for limiting the rearward movement of said guard members to a substantially vertical position, and stop elements provided on the rearwardly disposed portions of said guard members and adapted to engage the rear of said bumper bar to limit the forward pivotal movement of said guard members to a substantially horizontal position.

10. In combination with a bumper bar, a bumper guard carried by said bumper bar comprising an upper guard member and a lower guard member pivotally connected together forward of said bumper bar, each of said guard members including an elongated body having a portion extendable rearward of said bumper bar, the rear side of said body being convexly curved, stop means for limiting the rearward movement of said guard member beyond a substantially vertical position, spring means urging said guard member in a rearward direction to normally dispose the rear portion of said guard member behind said bumper bar, and shoulders provided on the rear portion of said guard member and engageable with said bumper bar for limiting the forward swinging movement of said guard member to a substantially horizontal position.

ALEXANDER C. DE HOFFMANN.